March 1, 1927.
W. T. SKILLERN
HOSE CONNECTION
Filed Feb. 10, 1925
1,619,439
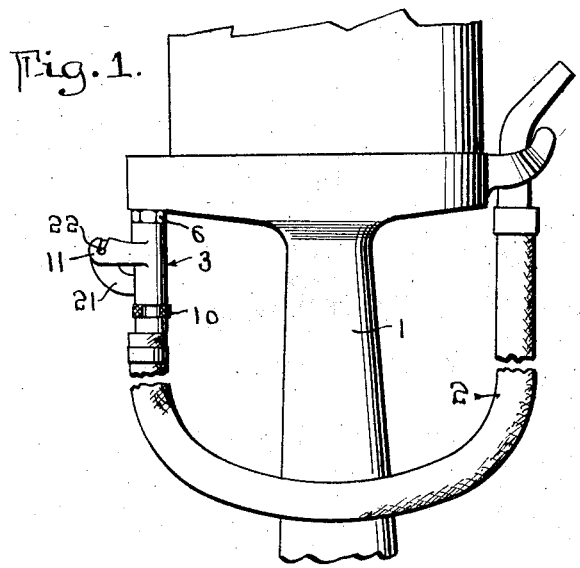
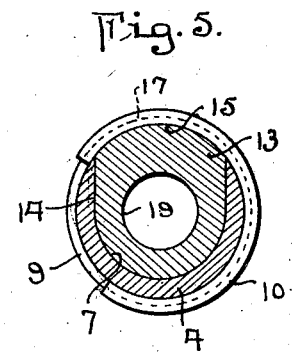
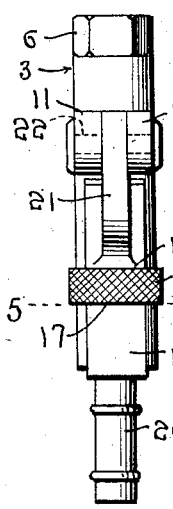
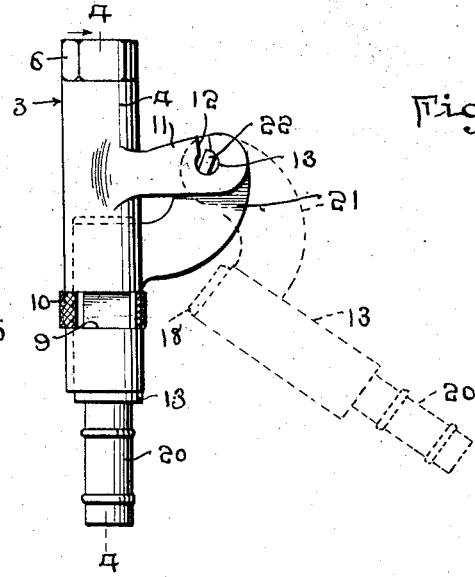
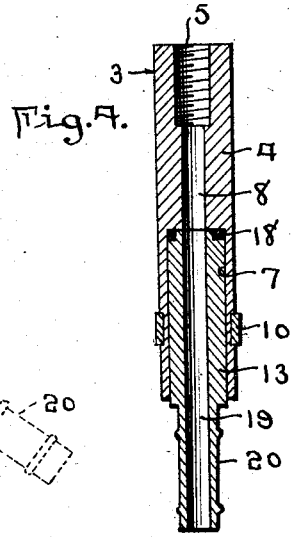
INVENTOR.
W. T. Skillern
BY R. J. Bassett
ATTORNEY Patented Mar. 1, 1927.

1,619,439

UNITED STATES PATENT OFFICE.

WILLIAM T. SKILLERN, OF BOISE, IDAHO.

HOSE CONNECTION.

Application filed February 10, 1925. Serial No. 8,146.

This invention relates to improvements in hose connections for gasoline pumps, air pumps and the like.

It has been found in certain localities that the hose of air and gasoline pumps are cut during the night and stolen.

The primary object of the present invention is to provide a hose connection to permit the hose to be readily detached from either an air or gasoline pump, so that the attendant of a service station, for instance, may take the hose off of the pump and lock the same up for the night.

With the foregoing object outlined and with other objects in view which will appear as the description proceeds, the invention consists in the features hereinafter described in detail and illustrated in the accompanying drawing.

Referring to the drawing:

Figure 1 is a side view of a portion of a gasoline pump with its hose secured in place by my improved hose-connection or joint.

Fig. 2 is an enlarged side view of the joint.

Fig. 3 is a similar view taken from a different angle.

Fig. 4 is a vertical sectional view of the same taken on line 4—4 of Fig. 3.

Fig. 5 is an enlarged horizontal sectional view taken on line 5—5 of Fig. 2.

In the drawing, 1 designates a portion of a gasoline pump and 2 indicates the discharge hose of the same. My improved hose connection or joint is designated 3 and it consists of a tubular body portion 4 having internal threads 5 at its upper end to engage a nipple (not shown) on the pump. An angular surface 6 is provided on the exterior of the body 4 to facilitate attachment to said nipple.

The lower portion of the body has a U-shaped recess or channel 7 which merges into the bore 8 of the body.

The body is also provided with a circumferential groove 9, in which is arranged a split resilient ring 10.

The body is also provided with outwardly extending arms 11, each having a recess 12 provided with a circular enlargement 13.

The body portion and the parts just described remain permanently connected to the pump, and I will now describe what may be termed the detachable portion of the device. This consists of a tubular member 13 having a U-shaped outer surface 14 to fit in the channel 7. The tubular part 13 also has an arc-shaped surface 15 which forms a continuation of the bottom of the groove 9 when the parts are assembled. The part 13 also has shoulders 16 and 17 arranged above and below its surface 15, so as to form a continuation of the groove 9. When the parts are in position to be assembled, the ring 10 may be rotated to engage the surface 15 and the shoulders 16 and 17, and this will prevent the tubular part 13 from leaving the part 4.

The tubular part 13 is reduced at its upper end and provided with a packing ring 18 to seal the joint between the bore 8 and the bore 19, and the bore 19 extends downwardly into a nipple 20, to which the hose 2 is attached permanently.

The part 13 has an outwardly and upwardly extending arm 21 provided with oppositely extending lugs 22. These lugs are so shaped that they will drop into the recesses 12 when the part 13 is in the dotted line position shown in Fig. 3, and then when the part 13 is moved into the full line position shown in this figure, the lugs 22 will interlock with the enlargements 13 and assist in holding the parts in assembled relation.

At night when the attendant desires to detach the hose from the pump, it is only necessary to turn the ring 10 until its split portion aligns with the mouth of the channel 7, and then the part 13 may be pulled outwardly into the dotted line position shown in Fig. 3 and the lugs 22 may be then lifted out of the recesses 12.

While I have described the hose connection in use with a pump, it is obvious that the same general construction may be used with water-pipes, gas pipes or any pipe-line where it is desired to connect two tubular members together.

From the foregoing it is believed that the construction, operation and advantages of the invention may be readily understood and it is apparent that changes may be made in the details disclosed without departing from the spirit of the invention as expressed in the claims.

What I claim and desire to secure by Letters-Patent is:

1. A hose connection for pumps or the like, including two tubular parts, one provided with a channel-shaped recess extending lengthwise of the same, and having its bottom surface substantially parallel to the axis of said parts, the other tubular part having a tubular extension occupying said recess, interlocked arms connecting said parts, and means for locking the tubular extension in said recess.

2. A hose connection for pumps or the like, including two tubular parts, one provided with a longitudinally extending channel having its bottom surface substantially parallel to the axis of said part, the other tubular member having a tubular extension occupying said channel, means surrounding the channel-shaped portion of one of said parts and the tubular extension of the other part, for preventing relative radial movement of the parts, and interlocked arms extending outwardly from and connecting said parts.

3. A hose connection for pumps or the like, including a first tubular part adapted to be permanently secured to a pump, said part having a longitudinally extending channel cut in from its outer surface, and the bottom surface of the channel being arranged substantially parallel to the axis of said part, a second tubular part having a tubular extension occupying said channel, means for preventing relative radial movement of said parts, and interlocked arms connecting said parts.

4. A hose connection for pumps or the like including a first tubular part having a longitudinally extending channel cut in from its outer surface and communicating with its bore, a second tubular part fitting in said channel and having its bore communicating with the bore of the first part, aligned grooves in said parts forming a continuous circular groove, a split ring arranged in the circular groove and adapted to detachably latch said parts together, arms on one of said parts provided with locking recesses, and an arm on the other part provided with lugs adapted to interlock with said recesses.

5. A connection for tubular members including two tubular parts, one provided with a channel-shaped recess having its mouth opening at one of the longitudinal sides of the connection and having its bottom surface parallel to the bores of said tubular parts, the other tubular part having a tubular extension occupying said recess, means for locking said parts together, and interlocked arms also connecting said parts.

6. A connection for tubular members including two tubular parts, one provided with a longitudinally extending channel-shaped recess, and the other provided with a longitudinally extending tubular part occupying said recess, means for locking said parts together, arms extending outwardly from one of said parts, each arm provided with a circular aperture merging into a slot having parallel edges, the distance between the parallel edges of each slot being less than the diameter of the aperture, and a single arm connected to the other part and having oppositely extending pins adapted to be inserted into said slots and to occupy the apertures, each pin being of the same width as each slot, and of the same height as the diameter of each of said apertures.

In testimony whereof I hereunto affix my signature.

WILLIAM T. SKILLERN.